M. JAEGER.
CLUTCH GRIP MANDREL.
APPLICATION FILED JAN. 14, 1910.
975,043.
Patented Nov. 8, 1910.
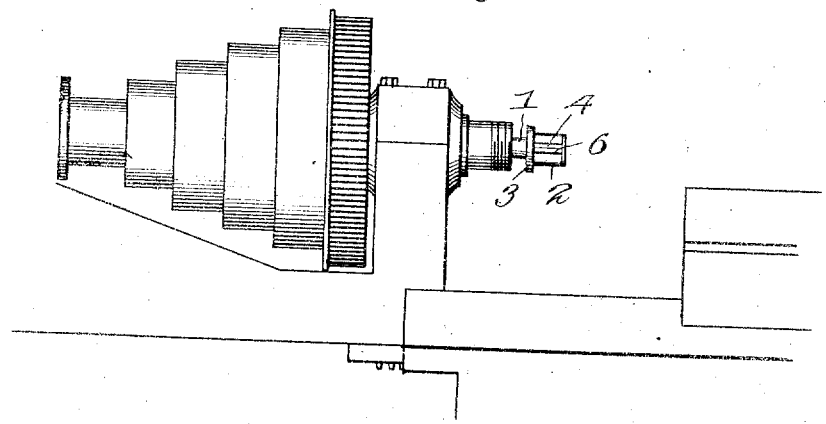
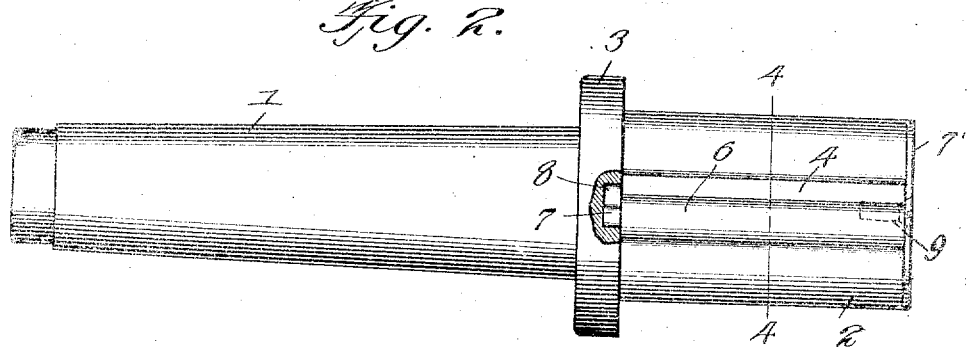
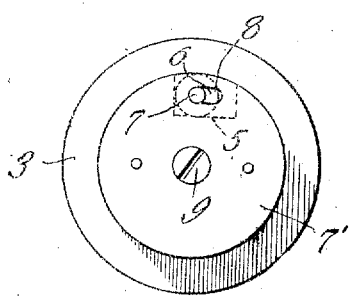
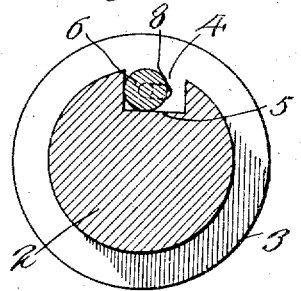
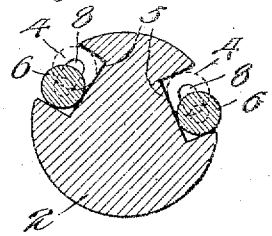
Witnesses
Frank B. Hoffman
V. B. Hillyard
Inventor
Maximillian Jaeger
By Victor J. Evans
Attorney

UNITED STATES PATENT OFFICE.

MAXIMILLIAN JAEGER, OF NEW LONDON, CONNECTICUT, ASSIGNOR OF ONE-HALF TO WILLIAM F. SWORD, OF PROVIDENCE, RHODE ISLAND.

CLUTCH-GRIP MANDREL.

975,043.  Specification of Letters Patent.  Patented Nov. 8, 1910.

Application filed January 14, 1910. Serial No. 538,096.

*To all whom it may concern:*

Be it known that I, MAXIMILLIAN JAEGER, a citizen of the United States, residing at New London, in the county of New London and State of Connecticut, have invented new and useful Improvements in Clutch-Grip Mandrels, of which the following is a specification.

This invention provides a work holder designed chiefly for lathes and for work which has been bored, reamed, or chucked.

The invention contemplates a mandrel having a roller clutch, which is automatic in operation, being released upon rotation of the work in one direction and engaged upon rotation of the work in the opposite direction, the mandrel having a recess in a side adapted to receive a roller, which is adapted to move upon the inner wall of said recess and in one position to be released from the work and in another position to grip the work by a wedging action.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a side view of the head stock of a metal turning lathe provided with a mandrel roller clutch embodying the invention. Fig. 2 is a view in elevation of the mandrel clutch, a portion being broken away to show the journal at the inner end of the roller clutch. Fig. 3 is an end view of the mandrel. Fig. 4 is a transverse section on the line 4—4 of Fig. 2. Fig. 5 is a sectional view similar to Fig. 4 of a modification.

Corresponding and like parts are referred to in the following description, and indicated in all the views of the drawing, by the same reference characters.

The mandrel, which may be of any size or form according to the machine for which designed and the special nature of the work in hand, comprises a shank portion 1 and a work-gripping portion 2, a shoulder or annular flange 3 separating the two parts 1 and 2. A recess 4 is provided in a side of the work-gripping portion 2 and the inner wall 5 of said recess is straight and is nearer the surface at one end than at the opposite end, with the result that the recess 4 is deeper at one side than at the opposite side. The work-gripping portion 2 is preferably cylindrical and the shank portion 1 tapered, although these forms are not essential and may vary to suit the work and machine for which the device is intended. The recess 4 extends throughout the length of the work-gripping portion 2 and is adapted to receive a roller 6, which constitutes a clutch, the diameter of the roller corresponding approximately to the depth of the recess 4 at the deepest side, so that when the roller 6 occupies a position at the deepest side of the recess 4 the work may be slipped on and off from the cylindrical part 2 of the mandrel. The roller 4 is of uniform diameter throughout its length and is provided at its ends with journals 7 adapted to enter slots 8 in the end walls of the recess 4, the inner end wall corresponding with the shoulder formed at the base of the cylindrical part 2 and the outer wall consisting of a cap plate 7, which is secured to the end of the mandrel in any manner, as by means of a machine screw or fastening 9. The slots 8 parallel the wall 5 of the recess 4. The purpose of the slots 8 and journals 7 is to prevent displacement of the roller 6 from the recess 4. The roller 6 constitutes a clutch and is adapted to wedge between the inclined wall 5 of the recess 4 and the wall of the door opening formed in the work slipped upon the mandrel. Rotation of the work upon the mandrel in one direction causes the roller 6 to ride upon the wall 5 and to become wedged between said wall and the wall of the opening or door of the work mounted upon the mandrel. Rotation of the work in the opposite direction causes the roller 6 to move downward upon the wall 5 toward the deeper side of the recess 4, thereby releasing said wall and admitting of the work being released and slipped from the mandrel. It is to be understood that the roller 6 will be of tempered steel or case hardened, so as to resist marring of its surface by gripping of the work, particularly when the latter is subjected to high pressure; and also that the mandrel is likewise of hardened steel and ground.

In the modification shown in Fig. 5 the cylindrical portion 2 of the mandrel is provided with a series of longitudinal recesses 4 and each recess is provided with a roller clutch 6, which is mounted therein and retained in place in substantially the same manner as set forth in connection with the construction disclosed in Figs. 2, 3 and 4.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention, what is claimed as new, is:—

1. A work holding mandrel provided in a side with a longitudinal recess having its inner wall straight, said recess being deeper at one side than at the opposite side, and having end walls in which are formed slots extending parallel with the inner wall of said recess, and a roller clutch placed in said recess and having terminal journals fitted in said slots in the end walls of the recess, said roller clutch being of a diameter greater than the depth of the shallower side of the recess and of a diameter corresponding approximately to the depth of the deeper side of said recess.

2. A work holding mandrel comprising a tapered end portion, a cylindrical end portion, and an intermediate shoulder or annular enlargement, and having a recess formed in a side of the cylindrical portion and extending the entire length thereof, said recess being deeper at one side than at the opposite side and having its inner wall straight, the shoulder formed at the base of the cylindrical portion having a slot extending parallel with the inner straight wall of the recess, a roller arranged in said recess and having journals at its ends, one of the journals entering the slot in the shoulder formed at the base of the cylindrical portion of the mandrel, and a cap plate secured to the end of the mandrel and having a slot to receive the outer journals of said roller, said slot paralleling the inner wall of the recess.

In testimony whereof I affix my signature in presence of two witnesses.

MAXIMILLIAN JAEGER.

Witnesses:
ALICE W. TALBOT,
JAMES ALFRED ROGERS.